United States Patent [19]

Ficker

[11] Patent Number: 5,487,510
[45] Date of Patent: Jan. 30, 1996

[54] APPARATUS FOR PREPARING RUBBER SCRAP FOR RECYCLING

[75] Inventor: Stefan Ficker, Munich, Germany

[73] Assignee: Ingenieurburo S. Ficker Verfahrenstechnik, Munich, Germany

[21] Appl. No.: 215,916

[22] Filed: Mar. 22, 1994

[30] Foreign Application Priority Data

Apr. 1, 1993 [DE] Germany .......................... 43 10 689.7

[51] Int. Cl.⁶ .................................................. B02C 19/08
[52] U.S. Cl. ...................... 241/199.6; 241/202; 241/205; 241/265
[58] Field of Search ............................. 241/199.1, 199.4, 241/199.5, 205, 199.8, 263, 265, 283, DIG. 31, 199.6, 202

[56] References Cited

U.S. PATENT DOCUMENTS

| | | | |
|---|---|---|---|
| 658,648 | 9/1900 | Jacques | 241/263 X |
| 1,212,113 | 1/1917 | Schäfer | 241/205 X |
| 1,723,546 | 8/1929 | Haney | 241/205 |
| 1,875,794 | 9/1932 | Zettergren | 241/199.5 X |
| 2,054,472 | 9/1936 | Tonkin | 241/205 |
| 2,174,471 | 9/1939 | McKeever | 241/205 |
| 4,784,338 | 11/1988 | Saladin | 241/205 X |

FOREIGN PATENT DOCUMENTS

| | | | |
|---|---|---|---|
| 2608383 | 2/1981 | Germany . | |
| 3232061 | 3/1984 | Germany . | |
| 419248 | 8/1974 | U.S.S.R. | 241/199.8 |
| 1301486 | 4/1987 | U.S.S.R. | 241/DIG. 31 |
| 1572591 | 7/1980 | United Kingdom | 241/263 |

*Primary Examiner*—Timothy V. Eley
*Attorney, Agent, or Firm*—Herbert Dubno; Andrew Wilford

[57] ABSTRACT

Rubber particles having textile and/or metallic inclusions are treated by first placing the particles on a support surface and then pressing the particles against the support surface in a direction transverse to the support surface with a surface of a press body exerting a pressure of in excess of 10 kg/cm² without contacting the surfaces with each other. Both of the surfaces are nonsmooth. In accordance with the invention the support surface and the press body are relatively displaced in a direction generally parallel to the support surface to subject the particles to shear.

13 Claims, 3 Drawing Sheets

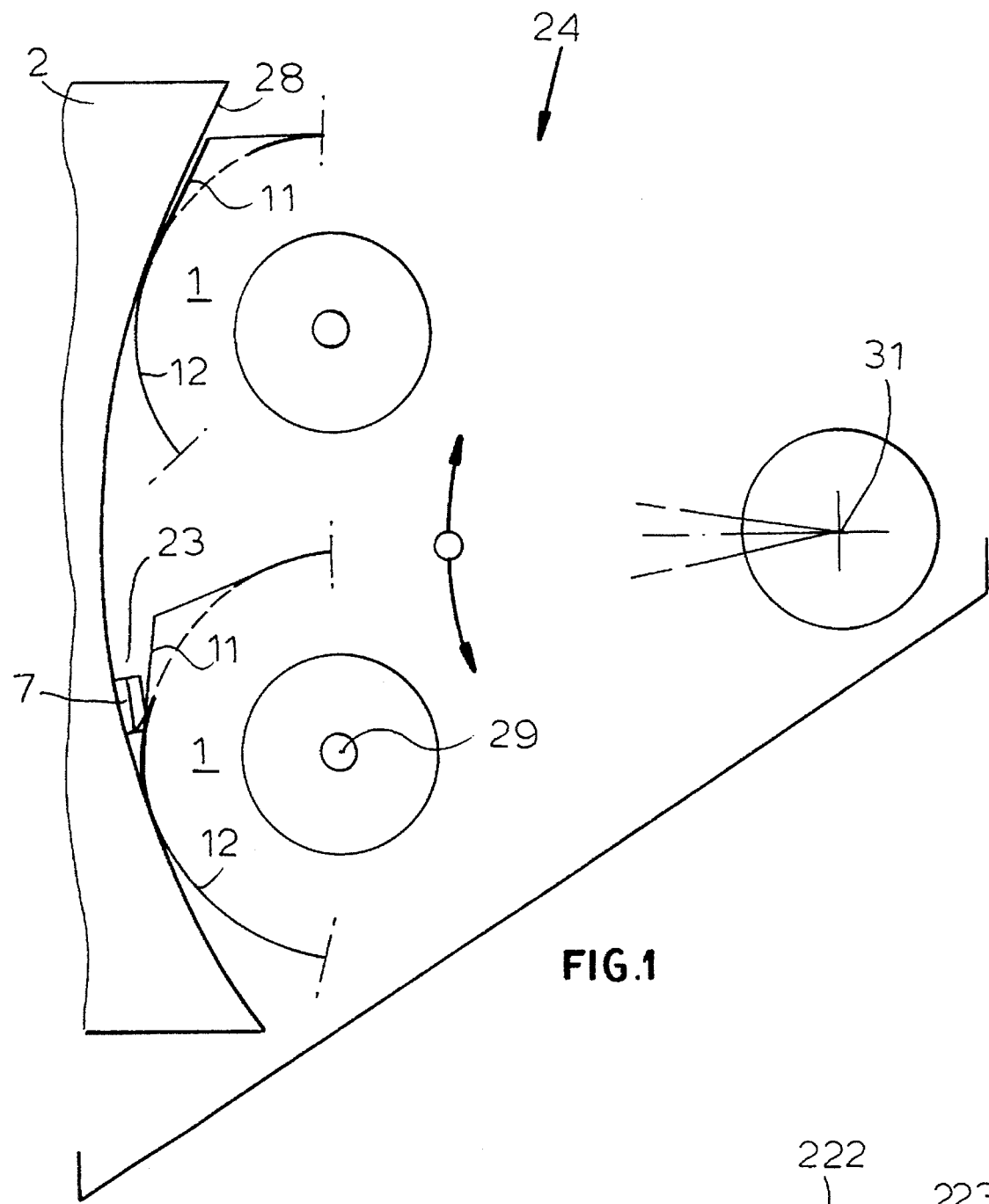
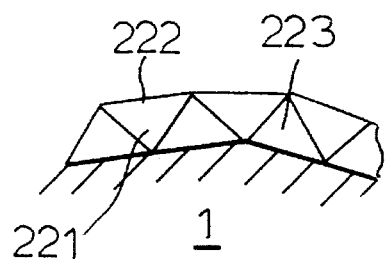
FIG.2A
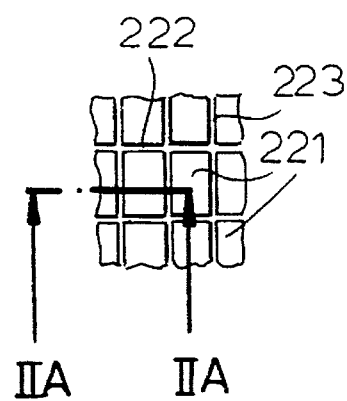
FIG.2

APPARATUS FOR PREPARING RUBBER SCRAP FOR RECYCLING

FIELD OF THE INVENTION

The present invention relates to the preparation of rubber scrap for recycling. More particularly this invention concerns the recycling of metal- and textile-containing rubber scrap, for instance comminuted tires, by separation of the metallic and textile phase from the elastomer.

BACKGROUND OF THE INVENTION

In the United States there are approximately 2 billion discarded tires in dumps, and the quantity is growing by about 270 million tires per year. Destruction of this waste by burning creates an unacceptable air-pollution problem, so that recourse must normally be had to recycling.

The standard tire contains in addition to the reusable elastomer, which may be a rubber of natural or synthetic origin, textile constituents from the bias-ply belts used in the tires, and metallic constituents from the bead wire and the belt in steel-belted tires. Unfortunately these textile and metal constituents are intimately bonded with the rubber they are imbedded in. Hereinbelow the term "rubber" is intended to include elastomers whether of natural or synthetic origin.

Thus recourse can be had to a method such as described in my German patent 2,608,383 issued 5 Feb. 1981. Here the tires are comminuted and the particles thus produced are stretched and deposited on a flat surface. A smooth-surfaced roller is moved back and forth over the particles, exerting on them a pressure of from 5 t to 500 t. After a dozen or more passes, the crushing effect normally separates the rubber from the steel and textile.

My German laid open patent application 3,232,061 issued 1 Mar. 1984 describes an improvement on this system which uses a ridged support surface, and even a nonsmooth roller in some instances. The rubber particles are preheated to 100° C. to 150° C. so that these particles need only be roller crushed some four or five times to achieve the necessary degree of separation.

In both of these procedures the pressure is enormous, so that after processing the surfaces are substantially worn. The ridged support surface and roller must be machined to reform teeth on them. The result is that the finished product, which is not extremely pure, is fairly costly and, in fact, substantially more expensive than virgin rubber.

It has further been suggested to proceed in a so-called cold process, chilling the tires so that they become brittle enough to comminute in a standard hammer mill. When sufficiently chilled the rubber is no longer an elastomer, but instead is so embrittled that is can be broken like glass. Such a procedure is, however, quite expensive. About 0.5 kg to 1.0 kg of liquid nitrogen is consumed for each 1.0 kg of rubber embrittled, at a cost of about 0.3 to 0.8 DM/kg, for an average cost per kilogram of rubber of about 0.41 DM. The hammer mill and rotary drum use about 0.55 kWh/kg corresponding to about 0.08 DM/kg of rubber milled. Thus the processing costs are about 0.49 DM/kg of rubber, at best 0.15 DM/kg. The processing costs are therefore high, and the output of such a plant is normally quite limited.

In contrast the above-described patented processes use about 0.1 kWh/kg of rubber for comminution and about 0.25 kWh/kg for the crush-separation. As a result with these or similar processes the excess energy costs are about 0.04 DM/kg to 0.05 DM/kg of rubber.

OBJECTS OF THE INVENTION

It is therefore an object of the present invention to provide an improved system for treating textile- and metal-containing rubber.

Another object is the provision of such an improved system for treating textile- and metal-containing rubber which overcomes the above-given disadvantages, that is which is relatively energy efficient and which produces a finished product in which the rubber has been thoroughly separated from its textile and metal constituents.

SUMMARY OF THE INVENTION

Rubber particles having textile and/or metallic inclusions are treated according to the invention by first placing the particles on a support surface and then pressing the particles against the support surface in a direction transverse to the support surface with a surface of a press body exerting a pressure of in excess of $10 kg/cm^2$, preferably $200 kg/cm^2$ to $2000 kg/cm^2$, without contacting the surfaces with each other. At least one of the surfaces is nonsmooth. In accordance with the invention the support surface and the press body are relatively displaced in a direction generally parallel to the support surface to subject the particles to shear.

Thus not only does the system crush the particles, but it subjects them to shear which effectively separates the inclusions from the rubber. The system is so efficient that one pass is normally all that is needed for a degree of separation that could only be achieved by the above-discussed prior-art systems with a dozen or more passes. Furthermore since the surfaces do not actually touch each other, they wear only nominally so that the one ridge surface will not wear smooth in short order as in the prior-art systems.

According to this invention before the particles are crushed and subjected to shear according to the invention they are comminuted to a mesh size of at most 6 cm, preferably 18 mm to 25 mm. Furthermore, after they are crushed and subjected to shear they are classified and particles of a mesh size greater than 1 cm are recirculated to the crushing/shearing stage, normally no more than 5% has to be recycled with the system of this invention. More specifically, the crushed/sheared particles are centrifuged to separate the rubber from the metal and textile. A magnetic separator is used to recover a ferromagnetic phase from the particles and a sieve may be used to separate out the textile phase.

The apparatus of this invention has a swing-type conveyor provided with a vane-wheel feeder to supply the particles to the crushing device. The support surface is part cylindrical and has a predetermined relatively large radius of curvature while the press-body surface has a part-cylindrical portion of the same large radius of curvature and immediately adjacent thereto a part-cylindrical portion of substantially smaller radius of curvature. Means is provided for rocking the press body while displacing it parallel to the support surface to alternately juxtapose the portions of its surface with the support surface so that when the small-radius portion is juxtaposed with the support surface the press-body surface forms a flaring sickle-shaped gap with the support surface. As the press body is rocked a space between its surface and the support surface varies from between 0.1 mm and 0.3 mm to between 1 mm and 4 mm. This rocking is effected by a pivot carrying the press body for pivoting about an axis and a pair of abutments for limiting pivoting of the press body relative to the axis. The rocking mechanism further includes a pivot arm pivotal about a main axis situated generally at a center of curvature of the support surface and having an outer end carrying the press-body axis and the abutments. The support arm is mounted on a block that is pulled by bolts against a pack of springs so that these pre-stressed springs define a maximum exertable force, in that when more force is exerted the springs will compress and allow the press body to push away from the support surface.

A spacer is provided at one end of the support surface to push the press body at least 4 mm off the support surface. This allows the treated particles to drop through for separation and so on as described above. Thus the press body makes one pass up and down, dumps the load of treated particles, and then can process another batch.

BRIEF DESCRIPTION OF THE DRAWING

The above and other objects, features, and advantages will become more readily apparent from the following description, reference being made to the accompanying drawing in which:

FIG. 1 is a largely schematic end view of the crushing apparatus according to the invention;

FIG. 2 is a large-scale view of a detail of FIG. 1;

FIG. 2A is a section taken along line IIA—IIA of FIG. 2;

SPECIFIC DESCRIPTION

Figure 3:
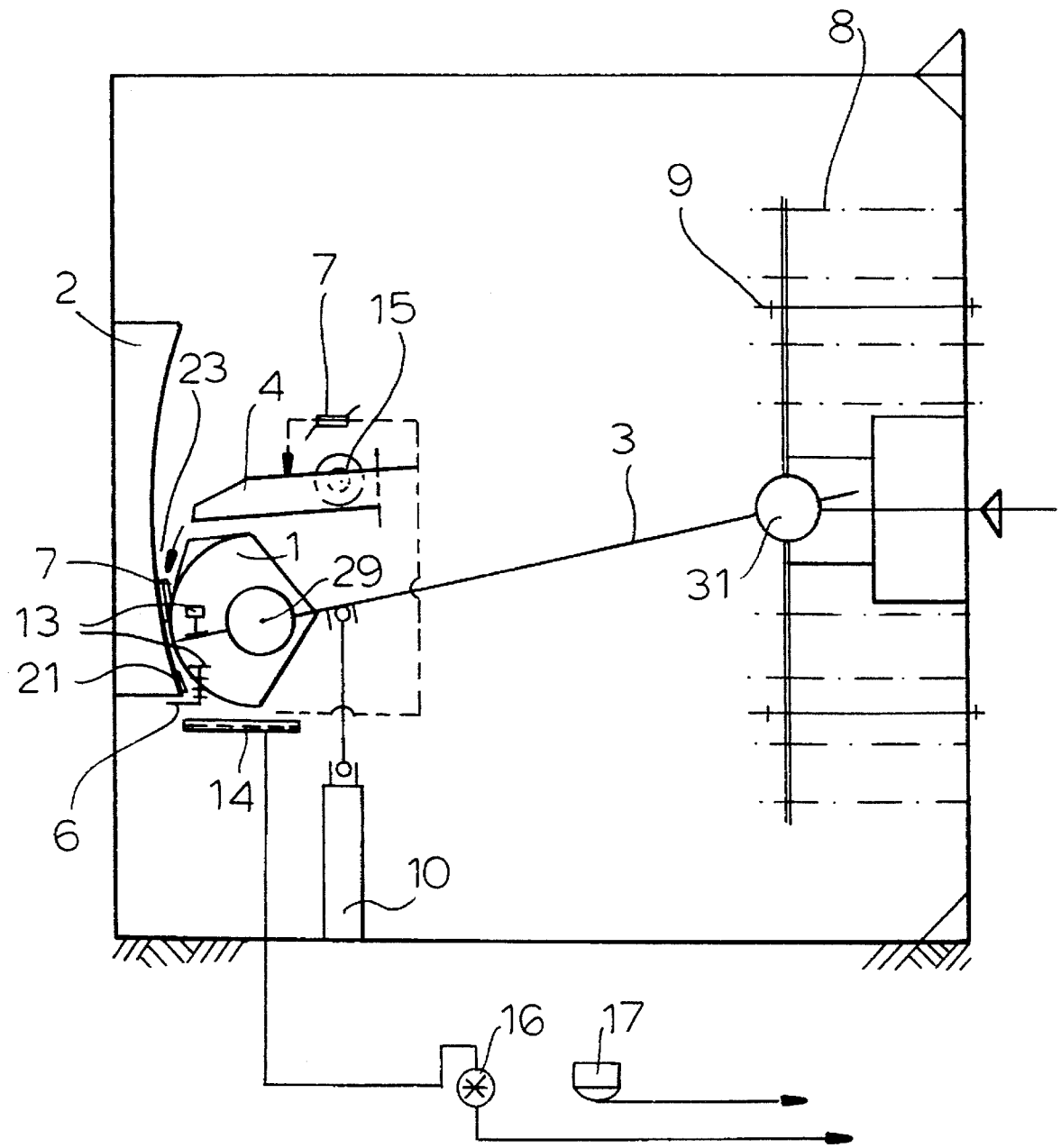
FIG. 3 is a largely schematic illustration of the treatment system of this invention.

As seen in FIG. 1 a crushing machine 24 according to the invention has a presser body 1 movable about an axis 31 relative to a support block 2 having a part-cylindrical surface 28 generally centered on the axis 31. The body 1 is also pivotal about an axis 29 and has a part-cylindrical surface portion 11 of the same radius of curvature as the surface 28 and an adjacent part-cylindrical surface portion 12 of much shorter radius of curvature, in fact centered on the axis 29.

As seen in FIGS. 2 and 2a, the surface of the body 1 is subdivided into recessed cells 221 by square-section ridges 222 running generally circumferentially of the axis 29 and sawtooth ridges 223 having front and back flanks respectively angled at 30° and 60° running parallel to the axis 29. The ridges 222 may in fact be bars or keys set in grooves in the ridges 223 and may by staggered relative to each other.

In use to start with as seen in the lower region of FIG. 1 the body 1 is positioned so that its portion 12 is turned to the surface 28 and its portion 11 forms a sickle-shaped and upwardly open gap 23 with this surface 28. Particles 7 of rubber with textile and steel inclusions are dumped into this gap 23.

The body 1 is then moved upward and simultaneously is pivoted counterclockwise as seen in the drawing about its axis 29, thereby bringing the portion 11 parallel to the surface 28 and thoroughly crushing the particles 7. Furthermore, as the body 1 moves parallel to the surface 28, it subjects the crushed particles to enormous shear forces, effectively separating the rubber from the nonrubber inclusions in it. The starting spacing at the portion 11 can be between 1 mm and 4 mm, but the ending spacing is less than 1.0 mm, preferably about 0.1 mm. The ridges 222 and 223, in particular the former, prevent the particles from extruding axially out of the space 23. The surfaces 11 and 12 on the one side never directly contact the surface 28, but always remain at a slight spacing from it.

As shown in more detail in FIG. 3 the axis 29 is carried on the outer end of an arm 3 pivotal by a hydraulic actuator 10 about the axis 31, which itself is carried on a support 9 mounted via prestressed springs 8. A pair of abutments 13, e.g. on the arm 3 or on body 1 define angular end positions for the body 1, a spring 6 normally pushes it clockwise into the illustrated position when the arm 3 is in its lowermost position. A follower-type conveyor 4 supplied by a spiked roller 15 feeds the particles 7 to the gap 28. The lower end of the surface 23 is provided with spacer blocks 21 that engage the body 1 in the lowermost position of the arm 3 to push it back against the springs 8 and open the gap 23 up to more than 4 mm, so that the crushed particles, which have a maximum mesh size of 1 cm, can drop through and fall on a sieve 14 whose output is fed to a cyclone that separates it by mass/density and a magnetic separator 17 that strips out the ferromagnetic fraction. The spacer 21 can be associated with a switching mechanism for reversing pivoting of the arm 3 and of the body 1 on the arm 3.

Figure 4:
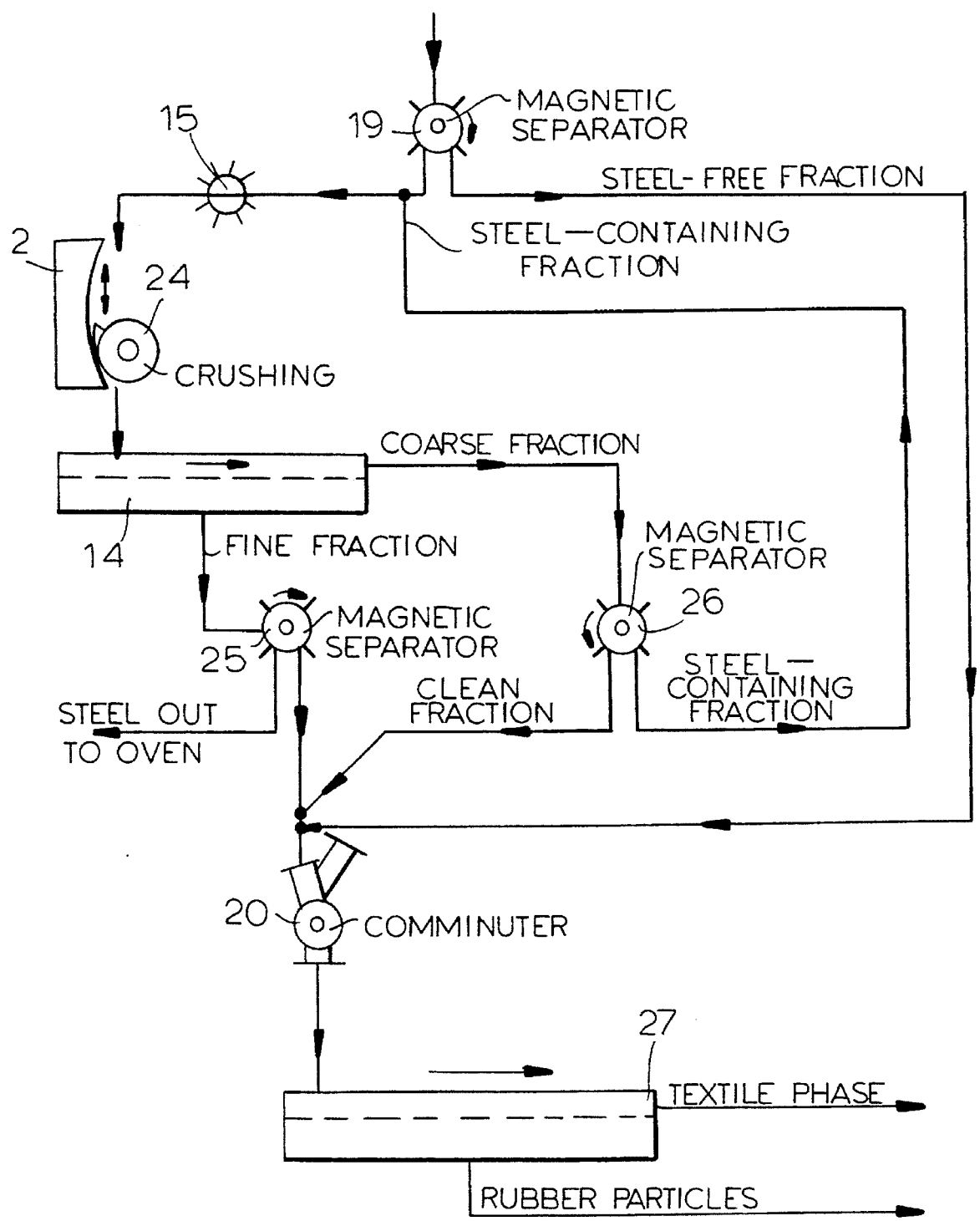
FIG. 4 is a wholly schematic diagram of the system of the present invention.

FIG. 4 shows how the incoming particles of rubber with ferromagnetic and textile inclusions are fed to a magnetic separator 19 from which steel-free particles of less than an 18 mm mesh size are fed directly to a mill 20 that chops them finer. The steel-containing fraction is passed through the above-described crusher 24 and sieve 14. The fine fraction (smaller than 12 mm mesh size) from the sieve is run through a magnetic separator 25 and the steel fraction derived therefrom is sent on to a furnace while the clean fraction is fed to the comminuter/chopper 20. The coarse fraction (greater than 12 mm mesh size) from the sieve 14 is run through another magnetic separator 26 from which the steel-containing fraction is recirculated to the input of the crusher 24. The clean fraction goes straight to the chopper 20. The output of the chopper is run through a three-screen sieve 27 that separates the rubber particles from the textile phase, the latter leaving the sieve 27 as a wooly mass.

I claim:

1. An apparatus for treating rubber particles having textile and/or metallic inclusions, the apparatus comprising:

a nonsmooth support surface;

a press body having a nonsmooth surface juxtaposed with the support surface, forming with the support surface a gap flaring opposite to a feed direction, and displaceable transverse and parallel to the support surface;

feed means for continuously feeding the particles in the feed direction to the gap;

first actuator means for pressing the particles against the support surface in a direction transverse to the support surface with the press-body surface at a pressure of in excess of 10 kg/cm$^2$; and second actuator means for relatively displacing the support surface and the press body in a direction generally parallel to the support surface and to the feed direction and thereby subjecting the particles to shear to separate the inclusions from the rubber of the particles.

2. The rubber-treating apparatus defined in claim 1 wherein the feed means is a swing-type conveyor.

3. The rubber-treating apparatus defined in claim 2 wherein the feed means includes a spiked roller feeder supplying the particles to the conveyor.

4. The rubber-treating apparatus defined in claim 1 wherein the support surface is part cylindrical and has a predetermined relatively large radius of curvature, the press-body surface having a part-cylindrical portion of the same large radius of curvature and immediately adjacent thereto a part-cylindrical portion of substantially smaller radius of curvature.

5. An apparatus for treating rubber particles having textile and/or metallic inclusions, the apparatus comprising:

a nonsmooth and part-cylindrical support surface having a predetermined relatively large radius of curvature;

feed means for placing the particles on the support surface;

a press body having a nonsmooth surface juxtaposed with the support surface and displaceable transverse and parallel to the support surface, the press-body surface having a part-cylindrical portion of the large radius of curvature and immediately adjacent thereto a part-cylindrical portion of substantially smaller radius of curvature;

first actuator means for pressing the particles against the support surface in a direction transverse to the support surface with the press-body surface at a pressure of in excess of 10 kg/cm$^2$;

second actuator means for relatively displacing the support surface and the press body in a direction generally parallel to the support surface and thereby subjecting the particles to shear; and means for rocking the press body while displacing it parallel to the support surface to alternately juxtapose the portions of its surface with the support surface, whereby when the small-radius portion is juxtaposed with the support surface the press-body surface forms a flaring sickle-shaped gap with the support surface.

6. The rubber-treating apparatus defined in claim 5 wherein as the press body is rocked a space between its surface and the support surface varies from between 0.1 mm and 0.3 mm to between 1 mm and 4 mm.

7. The rubber-treating apparatus defined in claim 5 wherein the means for rocking includes a pivot carrying the press body for pivoting about an axis and a pair of abutments for limiting pivoting of the press body relative to the axis.

8. The rubber-treating apparatus defined in claim 7 wherein the means for rocking includes a pivot arm pivotal about a main axis situated generally at a center of curvature of the support surface and having an outer end carrying the press-body axis, wherein the abutments are provided at the press-body.

9. The rubber-treating apparatus defined in claim 8, further comprising spring mounting means urging the support arm toward the support surface.

10. The rubber-treating apparatus defined in claim 9 wherein the spring means are prestressed.

11. The rubber-treating apparatus defined in claim 6, further comprising spring means urging the press body into a position with a spacing of between 1 mm and 4 mm.

12. The rubber-treating apparatus defined in claim 6 wherein the support surface has an end provided with a spacer engageable with the press body to hold it at least 4 mm off the support surface.

13. The rubber-treating apparatus defined in claim 12 further comprising spring means urging the press body into a position with its small-diameter surface portion engaging the spacer.

* * * * *